United States Patent
Feliciano, Jr. et al.

(10) Patent No.: US 8,033,553 B1
(45) Date of Patent: Oct. 11, 2011

(54) CARRYING DEVICE

(76) Inventors: Angel M Feliciano, Jr., Homer Glen, IL (US); Thomas G Bryant, Sr., Plainfield, IL (US)

( * ) Notice: Subject to any disclaimer, the term of this patent is extended or adjusted under 35 U.S.C. 154(b) by 402 days.

(21) Appl. No.: 12/341,085

(22) Filed: Dec. 22, 2008

Related U.S. Application Data

(60) Provisional application No. 61/009,258, filed on Dec. 27, 2007.

(51) Int. Cl.
*B62B 1/22* (2006.01)
(52) U.S. Cl. ............... 280/47.18; 280/638; 280/656; 280/43.1; 280/47.19
(58) Field of Classification Search .......... 280/638, 280/645, 652, 654, 656, 43.1, 43.14, 47.18, 280/47.19
See application file for complete search history.

(56) References Cited

U.S. PATENT DOCUMENTS

| | | | |
|---|---|---|---|
| 1,486,655 A * | 3/1924 | Gourley | 280/47.24 |
| 2,636,745 A * | 4/1953 | Cartwright | 280/43.18 |
| 2,733,823 A * | 2/1956 | Evans | 414/476 |
| 2,938,735 A * | 5/1960 | Bennett | 280/656 |
| 3,779,573 A * | 12/1973 | Gullberg et al. | 280/656 |
| 3,887,208 A * | 6/1975 | Vidal | 280/648 |
| 4,214,774 A * | 7/1980 | Kluge | 280/652 |
| 4,946,186 A * | 8/1990 | Cheng | 280/646 |
| 5,201,540 A * | 4/1993 | Wu | 280/646 |
| 5,368,325 A * | 11/1994 | Hazen | 280/656 |
| 6,688,635 B1 * | 2/2004 | Watts | 280/652 |
| 2007/0246911 A1 * | 10/2007 | Shawyer | 280/414.1 |

* cited by examiner

*Primary Examiner* — J. Allen Shriver, II
*Assistant Examiner* — Bridget Avery
(74) *Attorney, Agent, or Firm* — Robert L. Marsh

(57) ABSTRACT

A transportation device consisting of an elongate central member with a handle at one end, and a pair of wheels rotatably mounted on the other end. A first cross member is oriented generally perpendicular to the central member between the first two ends thereof and has a connector attached thereto for removably retaining an object to the first cross member. A yoke is moveably attached to the elongate member near the pair of wheels and a second cross member also having a connector thereon for removably retaining an object thereto is attached to the second cross member.

7 Claims, 9 Drawing Sheets

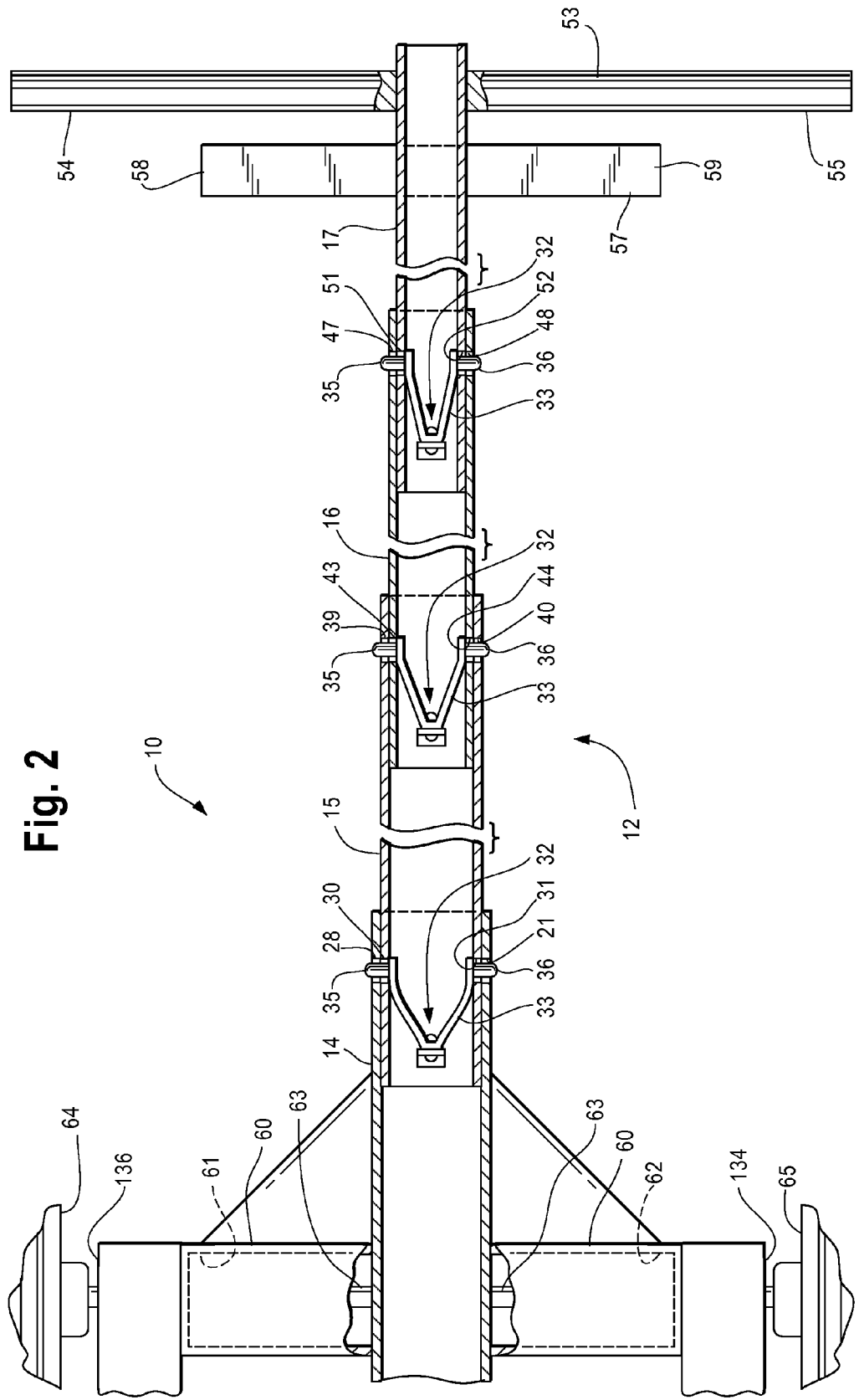

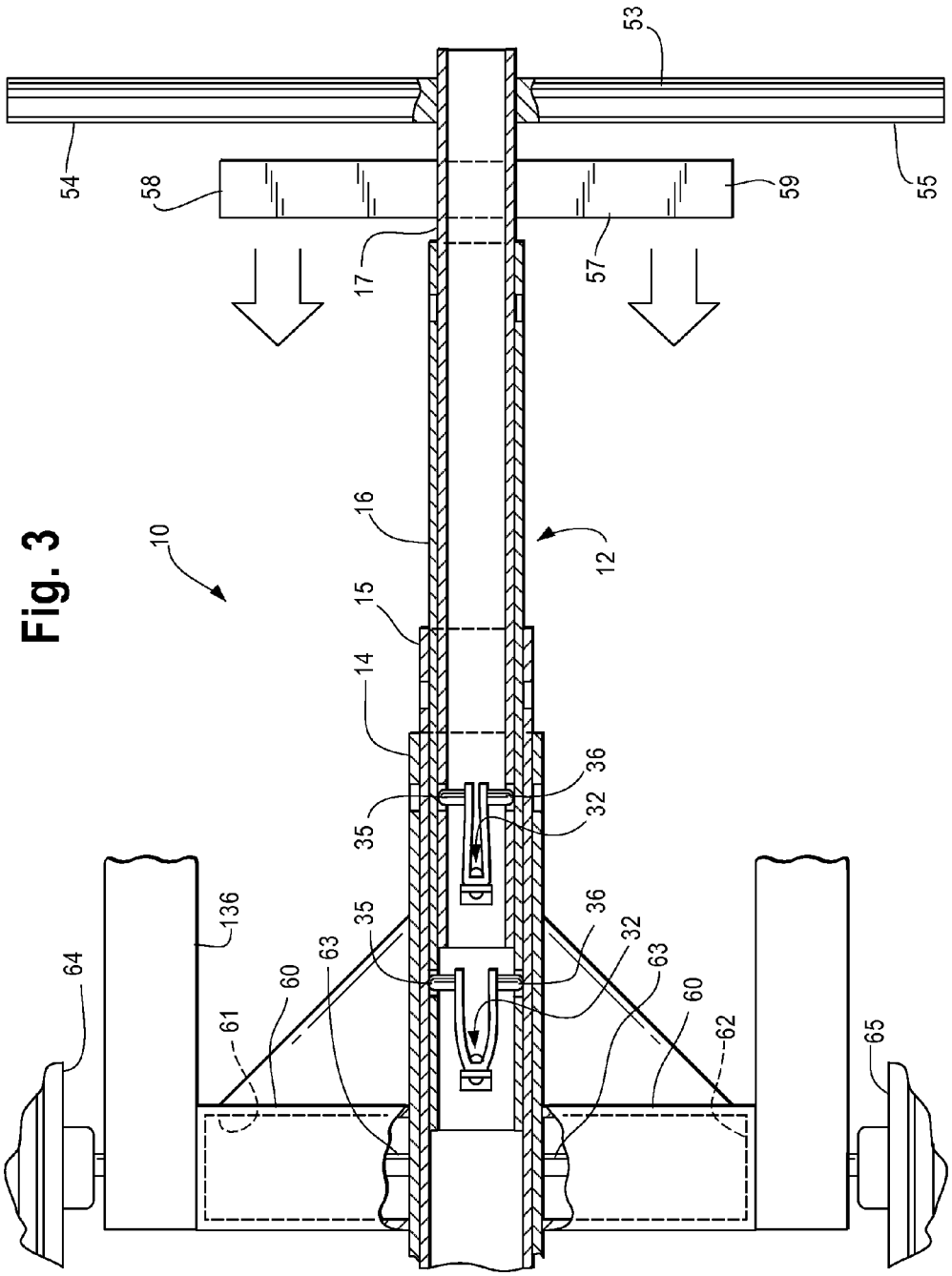

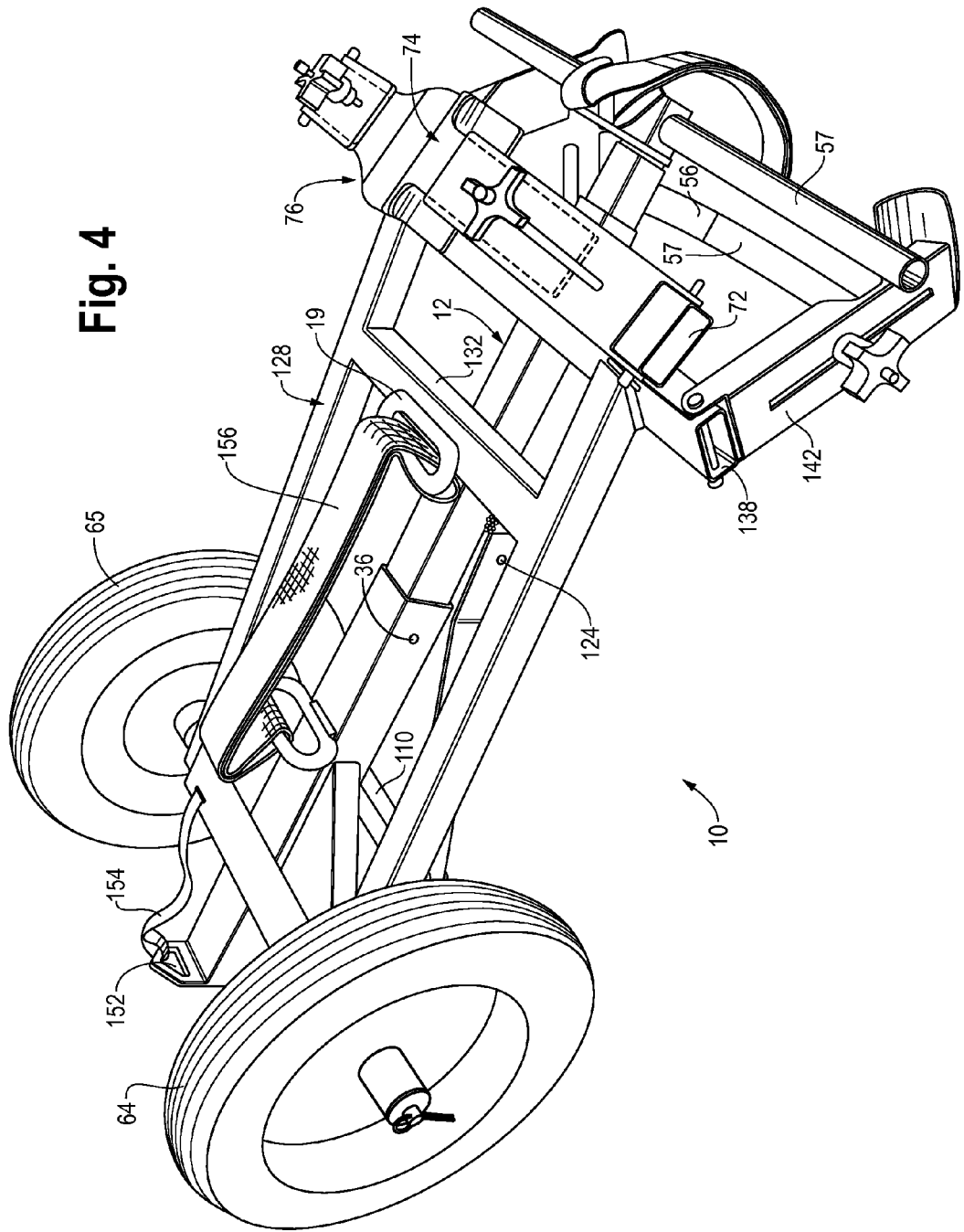

CARRYING DEVICE

The inventors claim priority from their provisional application filed Dec. 27, 2007 and assigned Ser. No. 61/009,258. The present invention relates to carrying devices for transporting equipment and the like for emergency personnel such as fire and police services.

BACKGROUND OF THE INVENTION

In the event of an emergency such as a fire or serious vehicle accident, emergency personnel are summoned. By the time such emergency personnel arrive at the scene, the surrounding area is often congested by vehicles and equipment from police and fire personnel who arrived earlier to the scene. It is not uncommon for such congestion to prevent a fire truck or other emergency vehicle from approaching any nearer than one block from the scene of a serious emergency. To carry out their tasks properly, the emergency personnel must personally transport certain equipment from the truck to the site of the emergency. Frequently, the equipment to be transported is heavy and awkward and as a result the arrival of such emergency personnel is often delayed by the task of transporting the necessary equipment. Since the equipment is moved by the physical strength of the personnel themselves, transporting the equipment also tires the emergency personnel thereby significantly reducing their effectiveness once they arrive at the scene. The vehicles used for transporting emergency personnel, such as fire trucks and ambulances and the like, contain a very large quantity of equipment, all of which must be transported in the vehicle even though only a small fraction of the equipment may be required at the scene of any one emergency. The cargo compartments of such emergency vehicles are therefore carefully engineered and very limited space is available for any additional device to assist in the transporting of equipment to the scene of an emergency. Nonetheless, fire and ambulance personnel are presently in need of a suitable compact transportation device to assist in the transporting of emergency equipment.

BRIEF DESCRIPTION OF THE INVENTION

Briefly, the present invention is embodied in a transportation device consisting of an elongate central support member having a first end and a second end. The support member has a handle at the first end and a pair of wheels rotatably mounted on the second end for rolling the device across an underlying surface. A first cross member is oriented generally perpendicular to the central support member, between the first end and the second end thereof and has a connector attached thereto for removably retaining an object to the first cross member. A second cross member is attached generally perpendicular to the elongate support member near the pair of wheels and is spaced from the first cross member. The second cross member also has a connector thereon for removably retaining an object thereto.

In the preferred embodiment, the elongate central member is telescopically collapsible so that the volume occupied by the entire device can be correspondingly reduced. Also, in the preferred embodiment, the first and second cross members each have a first end and a second end, and pivotally connected to each of the ends of the cross members is one end of an elongate connector. At the free end of each of the elongate connectors are attachment devices suitable for attachment to any of a number of shaped objects such that objects of many shapes and sizes may be attached to the first cross member.

In yet another embodiment of the invention, the elongate connectors are longitudinally adjustable for changing the overall length of the connectors for retaining objects of differing sizes and shapes.

BRIEF DESCRIPTION OF THE DRAWINGS

A better understanding of the invention will be had after a reading of the detailed description taken in conjunction with the drawings wherein:

FIG. 2 is a cross-sectional view of the central arm of the device of FIG. 1 taken with the parts in their extended orientation;

FIG. 3 is another cross-sectional view of the central arm of the device of FIG. 1 taken with the arm telescopically collapsed;

FIG. 4 is an isometric view of the device of FIG. 1 showing it in the collapsed position for storage on an emergency vehicle;

DETAILED DESCRIPTION OF THE INVENTION

Figure 1:
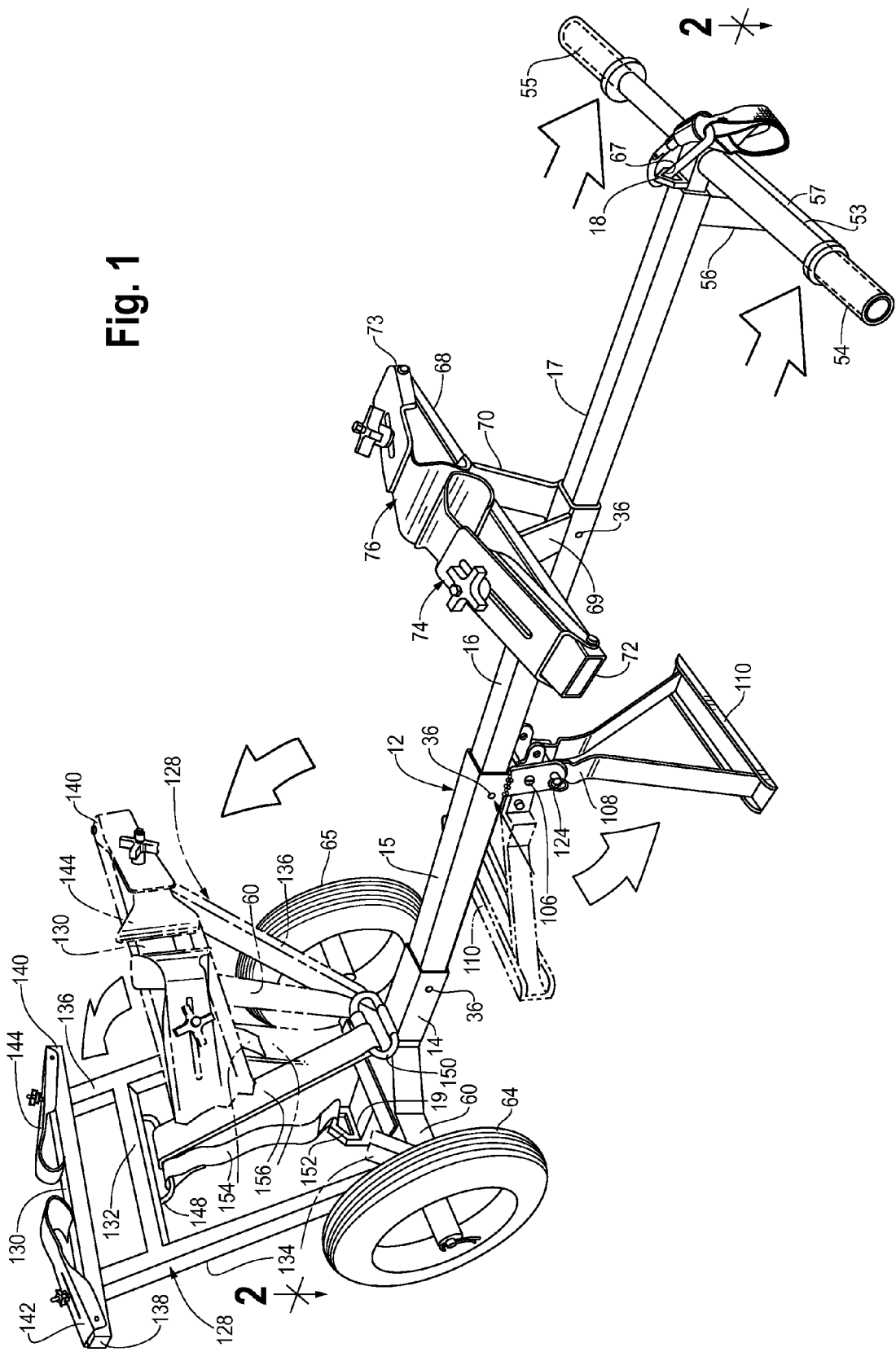
FIG. 1 is an isometric view of a carrying device in accordance with the present invention.
Figure 1A:
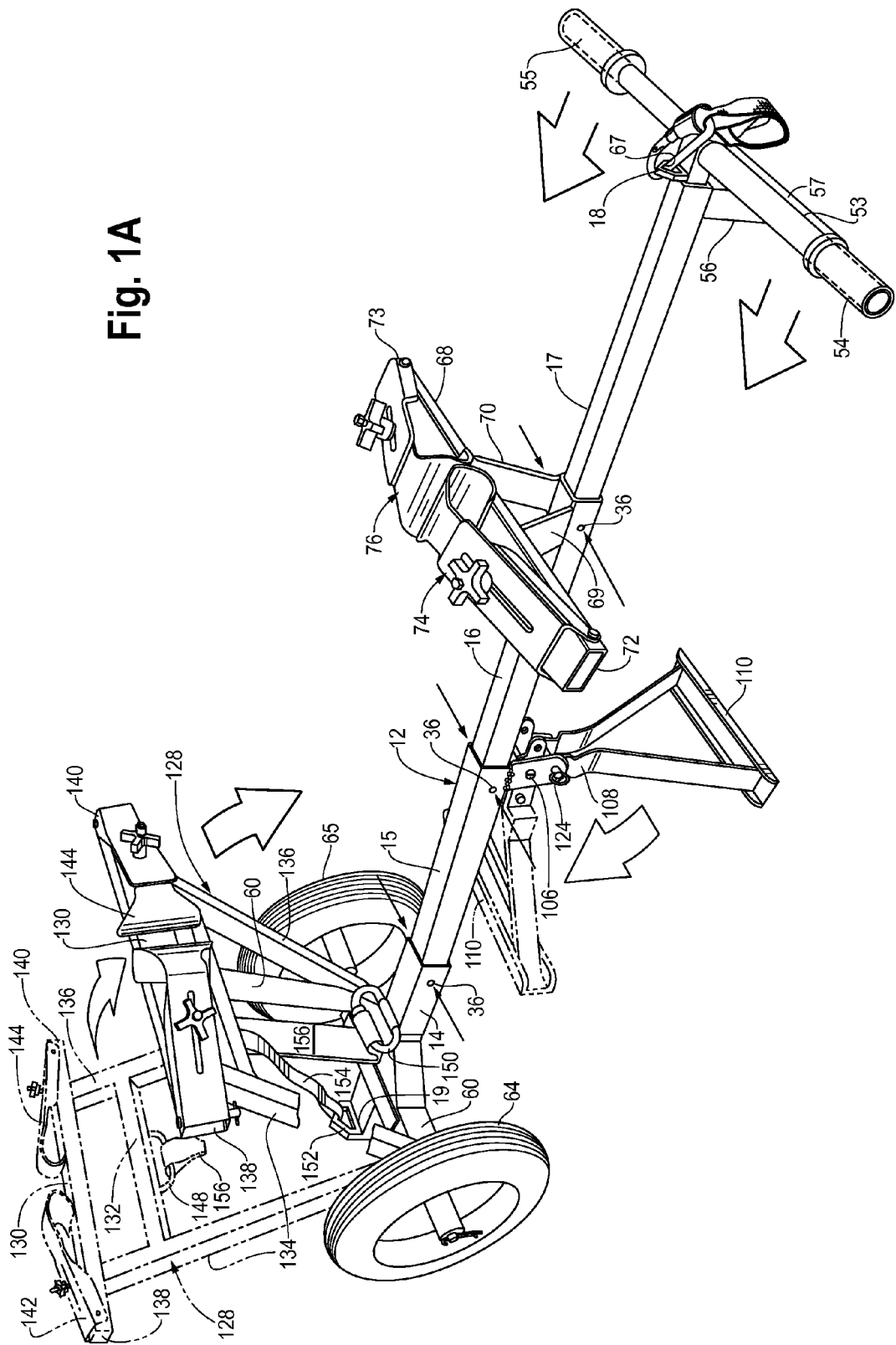
FIG. 1A is another isometric view of a carrying device shown in FIG. 1 depicting the movement of the yoke toward the first end of the arm as the device is collapsed.

Referring to FIGS. 1, 1A, 2, and 3 a transporting device 10 for transporting an elongate object to the site of an emergency includes an elongate telescopically extendable central arm 12. In the embodiment depicted, the arm 12 has four sections 14, 15, 16, 17, each of which has a generally square shaped cross-section formed by welding four metal plates of nearly equal width into an elongate hollow box. The first section 14 has a generally square shaped inner opening sized to slideably receive the next section 15 therein. The second section 15 also has a generally square shaped cross-section with the inner opening sized to slideably receive the next section 16 therein and section 16 has a generally square shaped cross-section with the inner opening sized to slideably receive the last section 17. Each of the sections 14, 15, 16, 17 that make up the elongate central arm 12 have first ends that are directed towards the first end 18 of the elongate central arm 12 and a second end that is directed toward the second end 19 of the arm 12. To form the telescopically collapsible arm 12, a portion of the second end of the second section 15 is fitted into the first end of section 14, a portion of the second end of the third section 16 is fitted into the first end of section 15, and a portion of the second end of the fourth portion 17 is fitted into the first end of the third section 16. As a result, the elongate central arm 12 can be longitudinally collapsed to a fraction of its overall length.

As best seen in FIGS. 2 and 3, the first section 14 has a pair of aligned transverse holes 28, 29 near the first end thereof and the second section 15 has a pair of transverse holes 30, 31 near the second end thereof. Inserted within the inner opening of the second section 15 is a locking pin 32 having a V-shaped spring 33 with an outwardly extending projection 35, 36 at the outer ends of each leg of the spring 33. The ends of the projections 35, 36 are positioned in the holes 30, 31 in the second section 15. When the second section 15 is fully extended from the first section 14, the holes 30, 31 of the second section 15 will become aligned with the holes 28, 29 of the first section 14 and the projections 35, 36 will extend through the aligned sets of holes 28, 30 and 29, 31 thereby locking the parts in their extended orientation. The outer ends of the projections 35, 36 are preferably hemispherical. To collapse the second section 15 into the first section 14, one compresses the projections 35, 36 with one's fingers allowing the inner surface of the first section 14 to move over the hemispherical outer ends of the projections 35, 36.

In similar fashion, the first end of the second section 15 has a pair of aligned transverse holes 39, 40 therein positioned to align with another pair of transverse holes 43, 44 near the second end of the third section 16. Another V-shaped spring locking pin 32 is inserted into the holes 43, 44 of the third section 16 to retain the third section 16 in its extended orientation with respect to the second section 15. Similarly, the first end of the third section 16 has a pair of holes 47, 48 therein positioned to align with another pair of transverse holes 51, 52 near the second end of the fourth section 17. Yet another V-shaped locking pin 32 is inserted into the holes 51, 52 of the fourth section 17 to retain the fourth section 17 in its extended orientation with respect to the third section. To collapse the extended arm 12, the projections 35, 36 of each spring pin 32 is compressed in succession and the sections 14, 15, 16, 17 pressed together. To extend the central arm 12, the first end of section 17 is pulled outward of the others until the pairs of holes of each section 14-17 come into alignment and the spring locking pins 32 snap each section in its expanded orientation.

Referring further to FIG. 1, at the first end of the third section 17 of arm 12 is a transverse handle 53 oriented perpendicular to the central arm 12 and having opposing gripping members 54, 55 for pulling the device 10 across the ground. Positioned below the handle 53 is a downwardly extending post 56 and welded across the lower end of the post 56 is a transverse rack 57. An eye 67 is welded to the upper surface of the third section 17 near the handle 53 for receiving a connector as is further described below.

Referring to FIGS. 1, 2 and 3, spaced a short distance from the second end 19 of first section 14 of arm 12 is a cross member 60 having a rectangular cross-section similar to that of the first section 14. At the outer ends of cross member 60 are outer end caps 61, 62. Extending longitudinally through the length of the cross member 60 and through centrally located transverse holes, unnumbered, in the end caps 61, 62 is an axle shaft 63. Rotatably connected to the outer ends of axle shaft 63 are a pair of rotatable wheels 64, 65 suitable for transporting the device 10 across an underlying surface such as the pavement of a street.

Positioned near the first end of the third section 16 of central arm 12 is a second cross member 68. In the preferred embodiment, the second cross member 68 is retained by a pair of support arms 69, 70 so as to be spaced a short distance above the elongate central arm 12. The second cross member 68 has first and second outer ends 72, 73 and pivotally mounted to the first end 72 is a first end of a longitudinally adjustable clamp 74. Similarly, pivotally mounted to the second end 73 of the second cross member 68 is a first end of a second longitudinally adjustable clamp 76 that is structurally identical to the first clamp 74.

Figure 5:
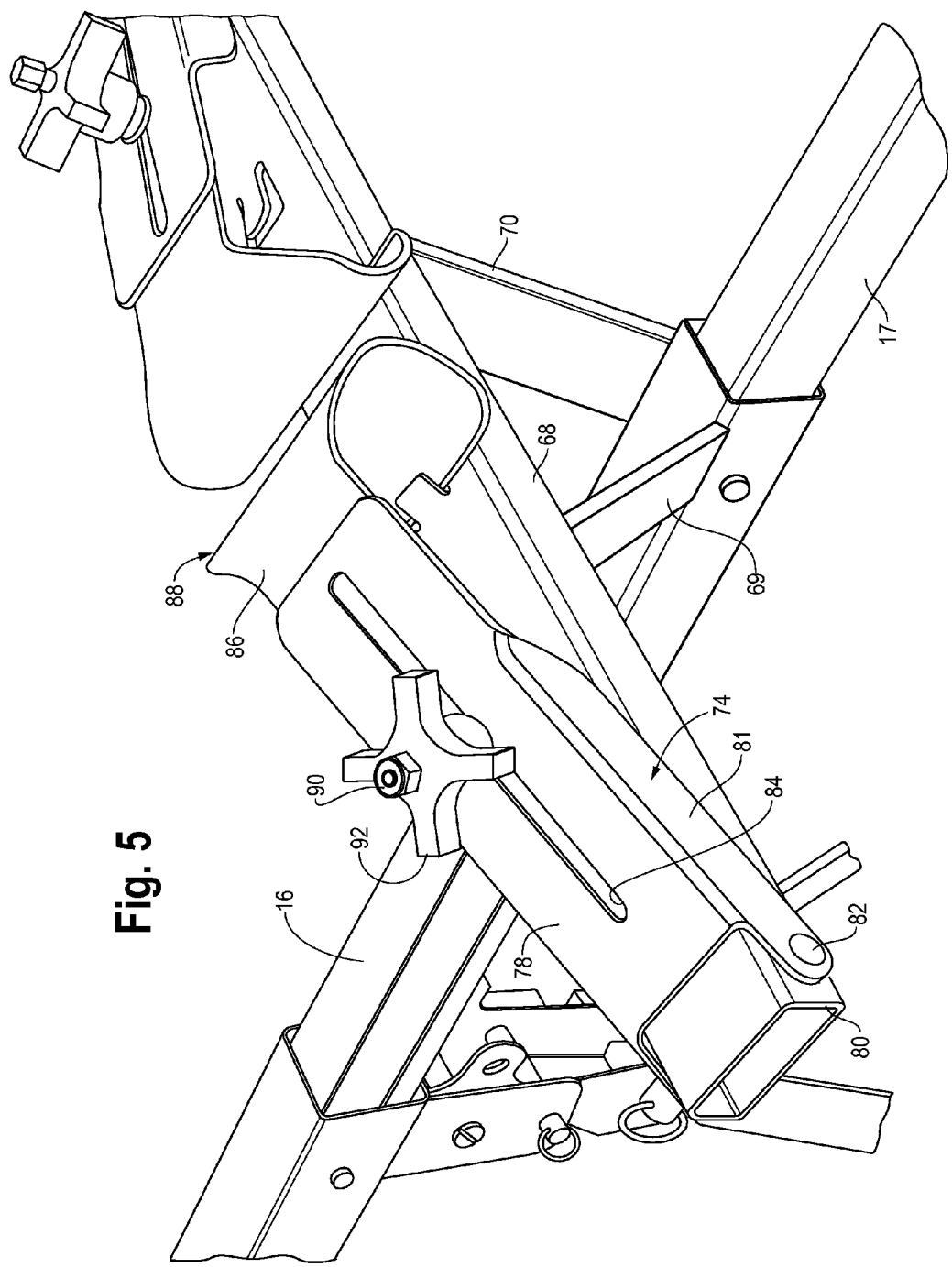
FIG. 5 is a fragmentary enlarged isometric view of a portion of the second cross member of the device shown in FIG. 1.
Figure 6:
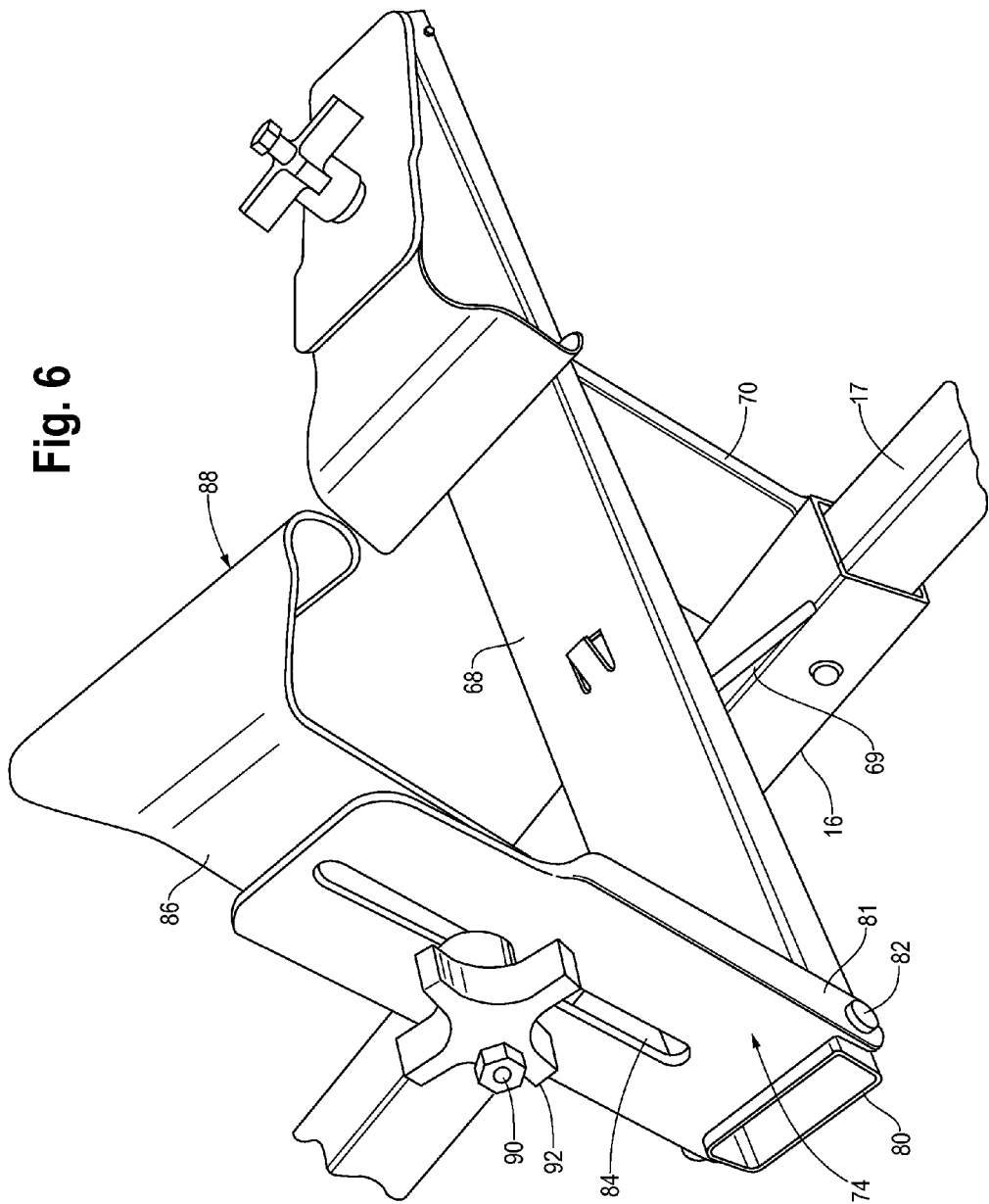
FIG. 6 is a second fragmentary enlarged isometric view of the cross member shown in FIG. 2.
Figure 7:
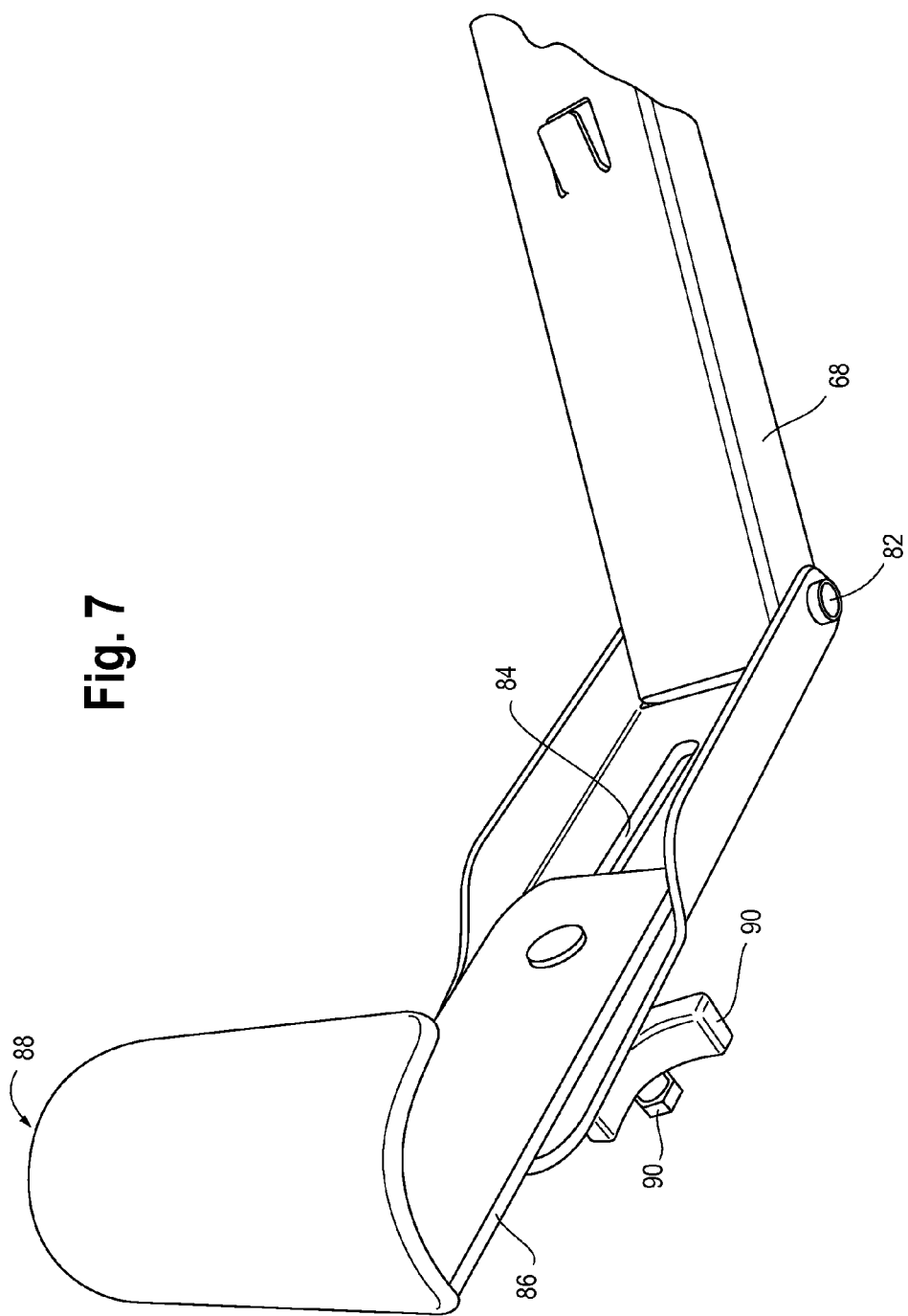
FIG. 7 is a third fragmentary enlarged isometric view of the clamp shown in FIGS. 5 and 6.

Referring to FIGS. 5, 6 and 7 in which only clamp 74 is visible, each of the longitudinally adjustable clamps 74, 76 is in the form of a bracket formed by a generally planar central body 78 and along opposite sides of the elongate central body 78 are first and second side panels 80, 81. The bracket 78 is rotatably attached to one of the distal ends of the second cross member 68 by an elongate bolt 82 that extends through a hole, not visible, in each of the side panels 80, 81 and through aligned holes, also not visible, in the second cross member 68 such that the central body 78 of the bracket is rotatable about an end of the second cross member 64. The central body 78 of the bracket has an elongate longitudinal slot 84 therein and slideably received between the side panels 80, 81 and along the inner wall of the central body 78 is a generally planar end panel 86 of an elongate hook 88. The end panel 86 has a transverse hole, not visible, therein and extending through the hole is a bolt 90 that also passes through the slot 84 in the central body 78. A wing nut 92 is hand tightened on the bolt 90 such that the length of the hook 88 can be longitudinally adjusted when the wing nut 92 is loosened with respect to the bolt 90 and locked into a desired length by manually tightening the wing nut 92 upon the bolt 90.

Figure 8:
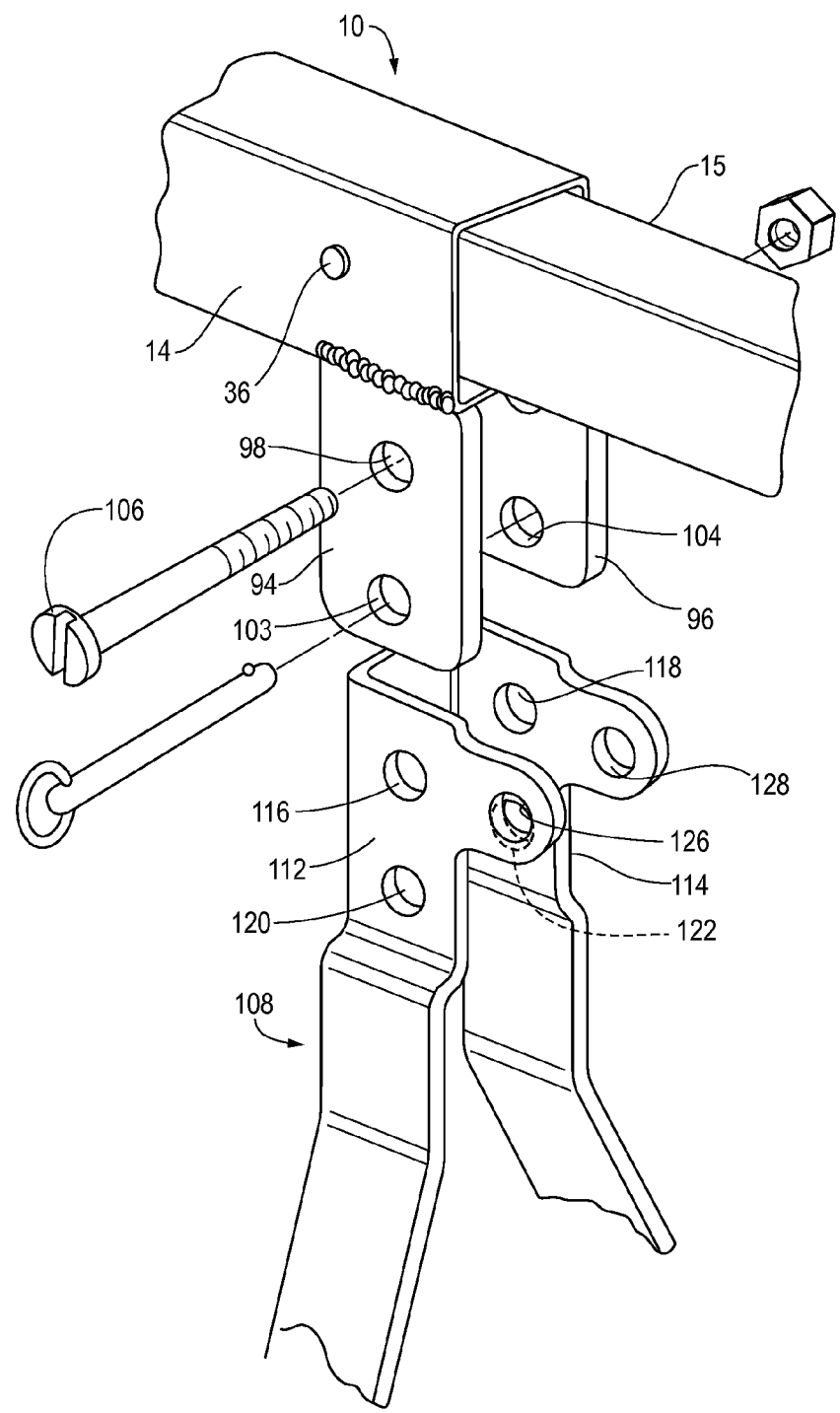
FIG. 8 is a fragmentary enlarged isometric exploded view showing portions of the central arm and the support leg for the device shown in FIG. 1.

Referring to FIGS. 1 and 8, extending downwardly from each side of the first end of the second section 15 are a pair of parallel retainer plates 94, 96 having an upper pair of aligned transverse holes, one of which 98 is visible in FIG. 8, and spaced about two inches below the upper holes are a lower pair 103, 104 of aligned holes. Pivotally, received on a pin 106 extending through the upper holes 98 is a moveable leg 108 having a foot 110 at the lower end thereof. The leg 108 has spaced apart plates 112, 114 at the upper end thereof adapted to fit between the retainer plates 94, 96. The spaced apart plates 112, 114 have an aligned first pair of holes 116, 118 for receiving the pivot pin 106, and below the first pair of holes are a second set of aligned holes 120, 122 that align with the lower pair of aligned holes 103, 104 of the retainer plates when the leg is extended downwardly. A removable locking pin 124 is inserted into the two pairs of holes 103, 104 and 120, 122 to lock the leg 108 in an extended position, shown in FIG. 1, wherein the foot 110 will support one end of the device 10 on the ground. The plates 112, 114 have a third pair of aligned holes 126, 128 which will align with the lower pair of holes 103, 104 of the retainer plates 94, 96 when the leg 108 is pivoted to the folded position. To move the leg 108 from the extended position, shown in FIG. 1, to the folded position, shown in FIG. 4, the locking pin 124 is removed from holes 103, 104 and 120, 122 and the leg moved to the folded position, and the pin 124 inserted into holes 103, 104 and 126, 128.

Referring to FIGS. 1, 1A, 2, and 4, near the second end 19 of the arm 12 is a moveable yoke 128 having a central portion consisting of upper and lower transverse bars 130, 132 extending generally parallel to cross member 60, and extending from the outer ends of the bars 130, 132 are parallel first and second side members 134, 136. The lower ends of side members 134, 136 have aligned transverse holes therein, unnumbered, with side member 136 fitted between end cap 61 of cross member 60 and wheel 64 and the side member 134 fitted between the second end cap 62 of cross member 60 and wheel 65. The axle shaft 63 extends through the holes at the lower ends of end members 134, 136 such that the yoke is rotatable about the axle shaft 63.

The outer ends 138, 140 of bar 130 extend beyond side members 134, 136 and pivotally attached to the outer ends 138, 140 of bar 130 are pins, unnumbered, for pivotally retaining third and fourth clamps 142, 144, each of which is structurally identical to clamps 44, 46 described above.

Referring further to FIG. 1, attached to the center of the lower surface of bar 132 is a metal loop 148, and attached to the upper surface of the first end of first section 14 of the arm 12 is another metal loop 150. A third metal loop 152 is attached to the second end 19 of the first arm section 14. A first strap 154 is removably attachable by a clip at the ends thereof, unnumbered, between loop 148 on bar 132 and loop 152 at the end of arm 12 to prevent the yoke 128 from swinging against the arm 12 while the device 10 is in use. A second strap 156 is removably attached by clips at the ends thereof, unnumbered, between loop 148 on bar 132 and loop 150 at the first end of section 14 to hold the yoke 128 at an angled orientation with respect to arm 12, as shown in FIG. 1. A gurney or carrying basket can then be retained under the clamps 74, 76, 142, 144. Elongate members such as a folding rescue ladder and fireman's pike poles can also be carried between rack 57 and bar 132. With the device so loaded, one person can easily transport the equipment from an emergency vehicle to the site where the equipment is needed.

The device 10 is preferably carried on a fire truck or in an ambulance and is stored on board in the collapsed position with the yoke 128 folded against the collapsed central arm 12 and the leg 108 pivoted around the pin 106 and locked in the folded position by pin 124 so as to extend generally parallel to the elongate central arm 12. Fire trucks and the like have a plurality of compartments, many of which will receive objects having outer dimensions of one and one-half feet by two feet by two and one-half feet. To fit standard compartments, the axle shaft 63 is preferably a little shorter than two feet long and the arm 12 telescopes downward to within two and one-half feet. Once at the scene, the device is erected by longitudinally extending the sections 14, 15, 16, 17 of the central arm 12 and folding out the yoke 128 and the support leg 108. Any piece of elongate emergency equipment, such as a stretcher or carrying devices, is attachable to the device 10 by the clamps 74, 76, 142, 144. Fireman's pike poles and a collapsible ladder can be carried between the rack 57 and the lower bar 132 of the yoke. Once fully loaded, the device 10 with equipment thereon can be transported by a single individual holding the grip members 54, 55 of the handle 53.

While the present device has been described with respect to a single embodiment, it will be appreciated that many modifications and variations may be made without departing from the spirit and scope of the invention. It is therefore the intent of the appended claims to cover all such modifications and variations that fall within the spirit and scope of the invention.

What is claimed is:

1. A carrying device comprising
   an elongate support member having a first end and a second end,
   a handle at said first end,
   a pair of wheels rotatably mounted on an axle at said second end for rolling said device across an underlying surface,
   a first cross member between said first end and said second end and generally near said first end of said support member,
   a first connector on said first cross member for removably retaining an object thereto for transporting on said device,
   a yoke including a central portion and two side members,
   said side members having lower ends spaced from said central portion,
   said lower ends rotatably attached to said support member for rotation of said yoke in a plane perpendicular to said axle wherein said yoke is moveable between a first collapsed position and a second position for retaining said object thereon,
   a second cross member on said yoke perpendicular to said support member,
   a second connector on said second cross member for removably retaining said object thereto for transporting by said device.

2. The carrying device of claim 1 wherein said elongate support is telescopically collapsible.

3. The carrying device of claim 1 wherein said first connector includes a first hook member pivotally connected to a first end of said first cross member and a second hook member pivotally connected to a second end of said first cross member wherein said first and second hook members will retain objects having different sizes and shapes.

4. The device of claim 1 and further including
   a first strap extending between said yoke and said first end and a second strap extending between said yoke and said second end, and
   each of said first and second straps being disconnectable at an end thereof.

5. The device of claim 1 including a rack positioned near said handle.

6. The carrying device of claim 2 wherein said elongate support member will collapse to no more than two and one-half feet in length.

7. The carrying device of claim 3 wherein said first hook member is longitudinally adjustable for retaining objects having different sizes and shapes, said first hook member including a first portion pivotally attached to said first cross member, a second portion longitudinally adjustable with respect to said first portion, and a hook on said second portion.

\* \* \* \* \*